United States Patent Office 3,081,735
Patented Mar. 19, 1963

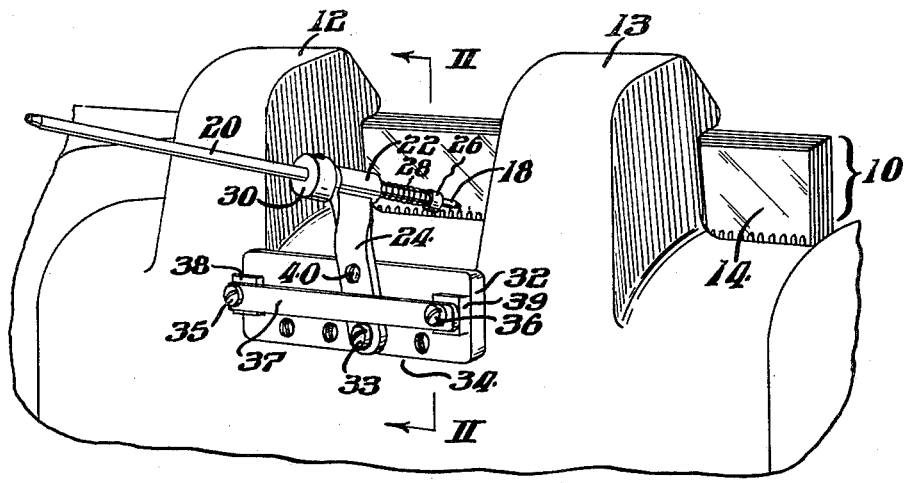
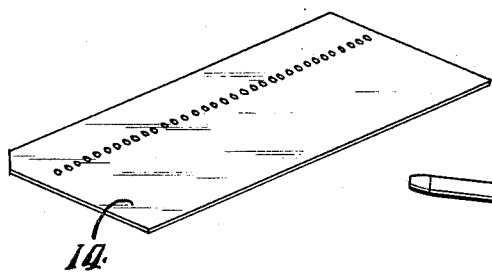
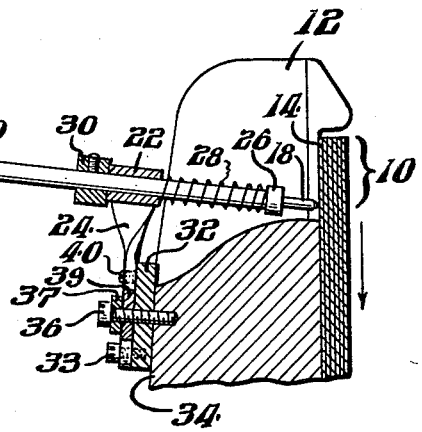
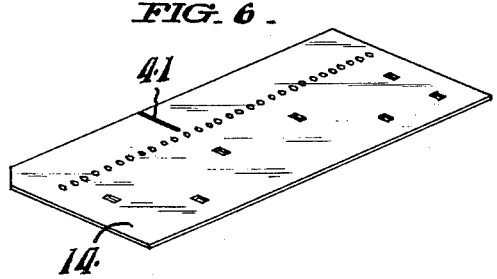
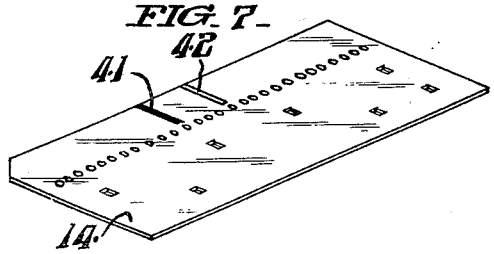

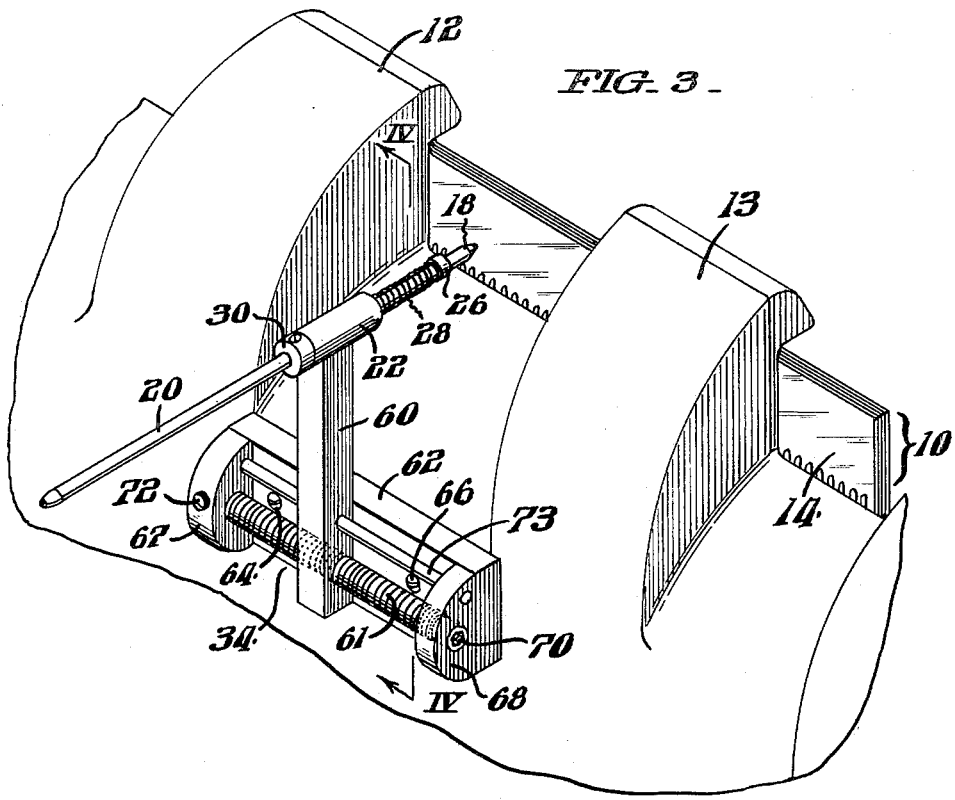
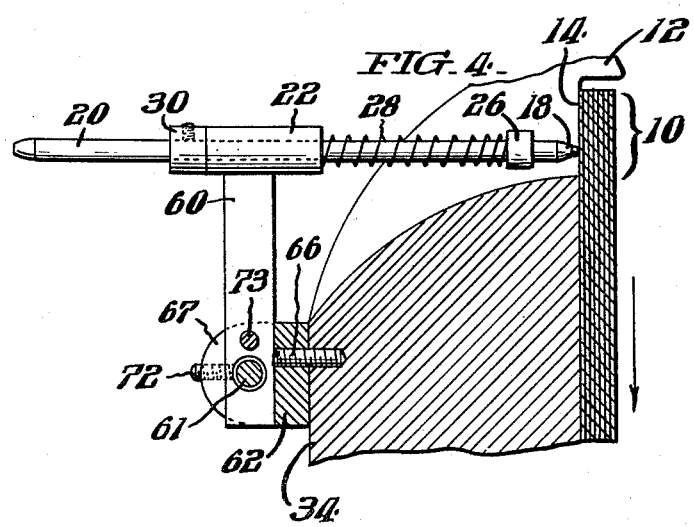

3,081,735
IDENTIFICATION OF AUTOMATIC BUSINESS MACHINE CARDS
Paul W. Clark, 4406 Reidsville Road, Winston-Salem, N.C.
Filed Jan. 18, 1960, Ser. No. 3,012
5 Claims. (Cl. 118—236)

This invention relates to means for applying automatically an identification mark to punch cards and the like used in automatic business machines, electronic computing, and similar machines.

It is, of course, extremely important that the basic raw data placed on punch and other forms of business machine cards by an operator, usually by manual manipulation of keys, be accurate and reliable since the ensuing operations during processing of the data is dependent upon the data originally recorded. A typical form of recording is a combination of punched holes. In recognition of the importance of accuracy in the initial recording on the card by, for example, a card punch machine, it is customary to have the hole punchings verified on a verifying machine. However, both the card punch machine and the verifying machine are manually keyed and hence dependent on the performance of the operator. It is quite possible to have a mistake made by the card punch operator not caught by the verifying operator. Such errors are obviously a serious and expensive hinderance to the efficient operation of the tabulating, accounting and calculating processes involved.

The card punch, verifying, and other similar business machines, of which I am aware, have no provision for identifying a particular card as having been punched by, or verified by, a particular machine or a particular operator. Thus, in a large operation where a bank of card punch machines are employed, it is difficult, and often impossible, after the cards have been intermingled during subsequent processing steps to trace the error to a particular card punch operator.

My present invention provides a means for identifying punch cards and the like with a particular card punch machine and a particular card punch operator, or with a particular card verifying machine and a particular verifying machine operator, and the like. Identification of the card as having passed through a particular machine is accomplished automatically and has been found to provide a real incentive for greater accuracy among card punch and verifying operators who now realize that cards punched or verified on their machines and while operated by them, carry a distinctive mark and thereby provide administrative personnel with means for tracing errors.

My present invention will be clearly understood from a consideration of the following detailed description of several preferred forms taken together with the drawings in which:

FIG. 1 is a perspective fragmentary illustration of a portion of the feed-in section of a typical card punch machine embodying an attachment according to my present invention;

FIG. 2 is a cross sectional view along the line II—II of FIG. 1;

FIG. 3 is a view similar to that of FIG. 1 but showing a modified form of attachment according to my present invention;

FIG. 4 is a cross sectional view along the line IV—IV of FIG. 3;

FIG. 5 is an illustration of a typical punch card before being fed through the feed-in section of the card punch machine;

FIG. 6 illustrates the same card shown in FIG. 5 after it has been fed through the card punch machine; and FIG. 7 is an illustration of the same card as shown in FIGS. 5 and 6 after it has been passed through the verifying machine.

In describing the preferred embodiments of my invention illustrated in the drawing, specific terminology has been resorted to for the sake of clarity. However, it is not my intention to be limited to the specific terms so selected, and it is to be understood that each specific term includes all technical equivalents which operate in a similar manner to accomplish a similar purpose.

Referring now to FIG. 1 there is shown a fragmentary view of the upper part of the feed-in section of a typical card punch machine having a stack of cards indicated generally by the reference numeral 10 vertically positioned on their long edges and held in compact face-to-back arrangement by a spring-loaded backing plate (not shown) against the stops members 12 and 13. Only five cards are shown in the illustration but it will be understood that in practice the stack of cards will ordinarily comprise many more than five cards.

In the operation of the card punch machine, the front card of the stack, identified as card 14 in the drawing, is fed downwardly along a generally curved path which turns the card 90° from its vertical position in stack 10 to a horizontal position (not shown). The card is then fed laterally under the punch head and holes are punched therein in accordance with the manual operation of the keyboard by the operator.

In accordance with a preferred embodiment of my present invention, there is mounted on the feed-in section of the card punch machine, in the position shown in FIG. 1, a marker stylus 18 which may be in the nature of a conventional ball point stylus mounted in a cartridge 20 which contains an inking material of the type used in ball point writing pens. Cartridge 20 extends through an axial hole in a cylindrical portion 22 of a bracket 24 and is held in position by a fixed collar 26, a compression spring 28, and an adjustable collar 30. These means are so adjusted that the stylus (or ball point) 18 presses against the surface of the front card 14 of the stack 10 as seen clearly in FIG. 2.

As shown in FIGS. 1 and 2, the bracket 24 is affixed to a base plate 32 by a screw 33. Bases plate 32 is rigidly fastened to the head plate 34 of the feed-in section of the card punch machine by screws 35 and 36 which extend through holes in a backing bar 37 and through holes in spacing blocks 38, 39. A set screw 40 is set in a threaded hole in bracket 24 and except when adjusting the position of the stylus the distal end of set screw rests against base plate 32. Thus, set screw 40 serves as an adjustable stop for setting the vertical or column alignment of the cartridge 20 and the stylus 18. For adjustment laterally of the marking position of stylus 18, set screw 40 is loosened and bracket 24 is rotated slightly in either a clockwise or counterclockwise direction with mounting screw 33 functioning as a pivot. For more extreme lateral changes in the marking position of stylus 18, the mounting screw 33 may be removed from the threaded hole in base plate 32 in which it is shown in FIG. 1 and placed in any one of a number of other holes in the base plate, three such additional holes being shown in FIG. 1.

It will be seen that when, in response to a signal from the keyboard, the front card 14 of the stack 10 is moved downwardly on its way to the punching position, the marking stylus 18 automatically imparts an identifying mark to the card at the preselected lateral position. This is clearly seen in FIGS. 6 and 7. FIG. 5 shows the condition of the card 14 before it is sent downwardly from its front-of-stack position. FIG. 6 shows the condition of the card after it has been fed through the punching position. As clearly shown in FIG. 6, as the card moved downwardly, an identifying line 41 was applied automatically by the pressure stylus 18 extending from a point corresponding to the initial position of the marking stylus to the top margin of the card.

FIG. 7 shows the same card after it has passed through the verifying machine. In so passing, an identifying mark 42 is made by the pressure stylus with which the verifying machine is equipped.

Thus, each card fed into a particular card punch machine while it is being operated by a particular operator, whom we may call Operator A, receives an identifying marker line such as that shown in FIG. 6. When Operator A is replaced by Operator B, the marker stylus 18 is adjusted to a new lateral position. Thus, the identifying mark is placed at a different column on the card. Well known forms of punch card have from fifty to eighty columns, consecutively numbered from left to right, and these numbered columns provide a readily available index for the identifying marking line placed by the stylus 18.

In FIG. 3, is shown slightly different means by which the marker stylus may be conveniently mounted. In FIG. 3, the bracket 60 is threadedly mounted on a traverse screw 61 which in turn is mounted on head plate 34 by a flanged base plate 62 secured to head plate 34 by two screws 64 and 66. The ends of the traverse screw 61 are unthreaded and are rotatably mounted in the two flanges 67, 68 of the base plate 62. One end of traverse screw 61 is equipped with an Allen head indenture 70 which is used for the purpose of turning the traverse screw 61. The flange 67 of base plate 62 supporting the other end of traverse screw 61 is equipped with a set screw 72 by means of which the traverse screw 61 may be locked in any position to which it is turned by the indenture 70. A guide rod 73, fixedly mounted into the two flanges 67 and 68 of base plate 62, passes through a hole in the bracket 60 in a slidable manner. Lateral positioning of the stylus 18 is obtained by rotation of the traverse screw by the use of an Allen head wrench inserted in the indenture 70.

I have shown in FIGS. 1 and 2 one way of adjustably mounting the pressure stylus 18; and I have shown in FIGS. 3 and 4 another way of adjustably mounting the pressure stylus 18. Still other ways are available and will occur to those skilled in these matters. Furthermore, while I prefer to use a pressure stylus because of its simplicity of operation and economy of cost, other ways of placing a unique sign on each card in response automatically to movement of the card into the machine are available. For example, a solenoid may be actuated by the making or breaking of an electric or light path when the card is fed into the machine. Such a solenoid operated marking device would, however, be more costly than the simple pressure stylus which I prefer. Such alternate embodiments are, however, within the spirit and concept of my invention as hereinafter claimed.

Having thus described my invention, I claim:

1. In a punch card or verifying machine in which a plurality of cards are stacked on edge in back-to-front relation awaiting movement through a feed-in section of said machine, the improvement which comprises the provision of a marker stylus mounted on said feed-in section and spring-pressed against the front card of the stack near an edge of said card for making a short line mark automatically thereon as the card is moved from its stacked position through the feed-in section of said machine for identifying said card by the location of said mark as having passed into that particular machine, said marker stylus being pivotally mountable in a plurality of different positions and being adapted to place an identifying line mark on the card at any one of a relatively large number of locations.

2. In a punch card or verifying machine in which a plurality of cards are stacked on edge in back-to-front relation awaiting movement through a feed-in section of said machine, the improvement which comprises the provision of a marker stylus mounted on said feed-in section and spring-pressed against the front card of the stack near an edge of said card for making a short line mark automatically thereon as the card is moved from its stacked position through the feed-in section of said machine for identifying said card by the location of said mark as having passed into that particular machine, said marker stylus being mounted by support means disposed transverse to the direction of movement of said card for movement to and positioning at any one of a large number of transverse positions.

3. In a card punch or like machine in which a plurality of cards are stacked in a feed-in section of said machine and from which said cards are automatically fed one by one to a punch or other work section, the improvement which comprises the provision of a marker stylus mounted on said feed-in section and spring-pressed against the front card of the stack at a selected lateral point on the card located near a horizontal edge of said card and adapted to make automatically an identifying vertical line on said card from said point to said edge as the card is fed into said machine, the identification being dependent on the lateral position of said vertical line, said marker stylus being movably mounted by support means disposed transverse to the direction of movement of said card for positioning at any one of a relatively large number of lateral positions.

4. In a card punch or like machine in which a plurality of cards are stacked in a feed-in section of said machine and from which said cards are automatically fed one by one to a punch or other work section, the improvement which comprises the provision of a marker stylus mounted on said feed-in section and spring-pressed against the front card of the stack at a selected lateral point on the card located near a horizontal edge of said card and adapted to make automatically an identifying vertical line on said card from said point to said edge as the card is fed into said machine, the identification being dependent on the lateral position of said vertical line, said marker stylus being pivotally mountable in each of a plurality of different lateral positions.

5. In a card punch or like machine in which a plurality of cards are stacked in a feed-in section of said machine and from which said cards are automatically fed one by one to a punch or other work section, the improvement which comprises the provision of a marker stylus mounted on said feed-in section and spring-pressed against the front card of the stack at a selected lateral point on the card located near a horizontal edge of said card and adapted to make automatically an identifying vertical line on said card from said point to said edge as the card is fed into said machine, the identification being dependent on the lateral position of said vertical line, said marker stylus being mounted on a traverse screw for lateral adjustment to a relatively large number of different lateral positions.

References Cited in the file of this patent

UNITED STATES PATENTS

| | | |
|---|---|---|
| 1,432,734 | Reed | Oct. 17, 1922 |
| 1,713,007 | Schaaff | May 14, 1929 |
| 2,144,263 | Lane | Jan. 17, 1939 |
| 2,750,857 | Lewis | June 19, 1956 |

FOREIGN PATENTS

| | | |
|---|---|---|
| 46,061 | Denmark | Aug. 3, 1932 |